2,933,490
CHROMIUM-CONTAINING AZO DYESTUFFS

Walter Biedermann, Fabio Beffa, and Guido Schetty, Basel, Switzerland, assignors to J. R. Geigy A.-G., Basel, Switzerland No Drawing. Application March 12, 1959
Serial No. 798,832

Claims priority, application Switzerland April 14, 1958

7 Claims. (Cl. 260—145)

Azo dyestuffs containing heavy metal which contain a monazo and a disazo dyestuff bound to a co-ordinative hexavalent heavy metal atom are described in U.S. patent application Ser. No. 635,084. These compex heavy metal compounds are suitable for the dyeing of organic materials of the most different kinds and are very valuable in particular because of their deep shades and the good fastness properties of the textile dyeings obtained therewith. The invention also concerns a process for the production of these dyestuffs which consists in adding a dicyclic metallising azo dyestuff to a dicyclic co-ordinated azo dyestuff containing a co-ordinative hexavalent heavy metal atom per dyestuff molecule, the dyestuffs being so chosen that the reaction product contains a monoazo and a disazo dyestuff bound in complex linkage at the heavy metal atom. Only those dicyclic metallising disazo dyestuffs are named which contain both azo groups at a single aromatic radical, namely bound at a benzene or naphthalene ring.

On further work being done on this subject, it has now been found that very valuable dyestuffs are also obtained if, in the process described, compounds are used as dicyclic metallising disazo dyestuffs which correspond to the formula II given below. These dyestuffs are characterised in that they consist of a metallisable monoazo dyestuff containing a non-metallisable monoazo dyestuff bound by way of a divalent bridging member.

The new chromium-containing azo dyestuffs are obtained by reacting a metallisable monoazo dyestuff of the general formula

$$A-N=N-B \qquad (II)$$

and a metallisable disazo dyestuff of the general formula

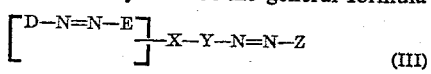

$$\left[D-N=N-E\right]-X-Y-N=N-Z \qquad (III)$$

wherein:

A and D represent the radicals of diazo components of the benzene and naphthalene series containing a metallisable group in o-position to the azo linkage, B and E represent the radicals of azo components coupled in the neighbouring position to a hydroxyl group, X represents a divalent bridging member of the series of carbonylamino, sulphonylamino and sulphonyloxy groups, and Y—N=N—Z represents the radical of a non-metallisable monoazo compound, with a chroming agent, the components being reacted simultaneously or one after the other and under such conditions that one molecule of the monozao dyestuff is bound by a chromium atom to one molecule of the disazo dyestuff.

The characteristic divalent bridging member X of the disazo dyestuff of the general Formula II is derived advantageously from a sulphonic acid group and is, thus, a sulphonic acid amide or a sulphonic acid ester group; it can also be derived however, from a carboxyl group and in this case it is a carboxylic acid amide group.

Two modifications of the process for the production of these symmetrical 2:1 chromium complex compounds are available. Either somewhat more than the equimolecular amount of an agent giving off chromium is reacted with an equimolecular mixture of the metal-free monoazo and disazo dyestuffs in a neutral to alkaline medium in the warm, in which case very probably first a so-called 1:1 metal complex is formed containing a whole chromium atom to one molecule of the dyestuff, which metal complex then forms the 2:1 complex with the other metal-free dyestuff. Or, one of the two azo dyestuffs, advantageously the monoazo dyestuff, is converted into the 1:1 complex and then the second, metal-free azo dyestuff is reacted. Particularly uniform and pure 2:1 chromium complex compounds are obtained by this addition process and it is, therefore, the process preferred according to the present invention. The first process mentioned is a simplified form of the addition process; production of the 1:1 chromium complex and addition of the second dyestuff molecule are performed in the presence of the starting materials.

In the textile dyestuffs according to the present invention, at least one of the two co-ordinated azo dyestuffs contains a sulphonyl substituent which increases the water solubility. Such substituents are sulphonic acid groups, sulphonic acid amide groups or low alkyl sulphonyl groups. However, the end product advantageously contains not more than one sulphonic acid group.

The metallisable monoazo dyestuffs of the general Formula I used according to the present invention are coupling products of diazonium compounds of the benzene and naphthalene series containing in the ortho-position to the diazo group a substituent capable of forming the metal complex or one which can be converted into such a group, with azo components coupling in the neighbouring position to a hydroxyl group. Metallisable groups are the carboxyl and hydroxyl groups and groups which can be converted into the latter during the metallisation reaction are, for example, the methoxy and ethoxy groups. The dyestuffs can contain other substituents usual in azo dyestuffs, for example, halogen, alkyl, alkoxy, aryloxy, nitro, cyano, acyl and acylamino, alkyl and arylsulphonyl groups and carboxylic acid amide and sulphonic acid amide groups possibly further substituted at the nitrogen atom. Thus, o-carboxy, o-alkoxy and o-hydroxy diazobenzene and diazonaphthalene compounds which possibly contain the above substituents are diazo components for monoazo dyestuffs used according to the present invention. As azo components are used chiefly 4-alkyl- or 2.4-dialkyl- or 2-acylamino-4-alkyl-1-hydroxybenzenes, also hydroxynaphthalenes such as 1- and 2-hydroxynaphthalene, 1.5-, 2.6- and 2.7-dihydroxynaphthalenes or suitable substituted derivatives thereof, then pyrazolones such as 1-aryl-3 - alkyl-5-pyrazolones, 1-aryl-5-pyrazolone-3-carboxylic acids and 1-aryl-5-pyrazolone-3-carboxylic acid amides as well as derivatives thereof further substituted in the aryl nucleus, and finally, acylacetylamino benzenes and naphthalenes. Monoazo compounds from such diazo and azo components are known per se. They are starting materials which are often used for the production of heavy metal complex dyestuffs for wool and material similar thereto. In the present process, chiefly the o.o'-dihydroxymonoazo dyestuffs are used.

In the disazo dyestuffs used according to the present invention of the general Formula II, the metallisable portion corresponds to the monoazo dyestuff of the general Formula I. The definition and explanation given above for these dyestuffs is also true of this part of the diazo dyestuffs. The non-metallisable portion, Y—N=N—Z, can contain the most various types of components, for example, components from the benzene or naphthalene series. They can contain the substituents usual in azo dyestuffs which are listed above. The carbonyl or sulphonyl group of the bridging member X can either be bound to a component of the metallisable or to a component of the non-metallisable portion of the disazo dyestuff.

Chiefly two methods are used for the production of the disazo dyestuffs used according to the present invention. The one consists in reacting together under suitable conditions while coupling, a metallisable and a non-metallisable monoazo dyestuff each of which contains a reactive group. Such reactive groups are on the one hand the amino or hydroxyl groups and, for example, on the other the carboxylic acid or sulphonic acid halide groups.

The second, often more advantageous method consists in reacting together either a diazo or azo component and a monoazo dyestuff each of which contains one of the previously named groups which can be coupled together and then coupling the reaction product with the remaining component to form the disazo dyestuff.

According to a preferred form of this second method, an acyloxynaphthalene sulphonic acid chloride is condensed with a non-metallisable amino or hydroxy monoazo dyestuff, the acyloxy group is saponified and the hydroxynaphthalene sulphonic acid amide or the corresponding ester is coupled in an alkaline medium with an o-carboxy or o-hydroxy benzene or naphthalene diazonium compound to form the disazo dyestuff. As acyloxynaphthalene sulphonic acid chlorides, in particular the acyl derivatives are used, for example the carbomethoxy or toluene sulphonyl derivatives of the 1-hydroxynaphthalene-3- or -4-sulphonic acid chlorides which are known per se and the 2-hydroxynaphthalene-4-, -5-, -6- or -7-sulphonic acid chlorides. As non-metallisable amino and hydroxy monoazo dyestuffs advantageously the easily accessible 4-amino- and 4-hydroxy azobenzenes are used. The disazo dyestuffs obtained with these components are thus the o-(arylazo)-hydroxynaphthalene sulphonic acid-4'-benzene azo phenylamides and the o-(arylazo)-hydroxynaphthalene sulphonic acid-4'-benzene azo phenyl esters. The corresponding 1-arylazo-2-hydroxynaphthalene-3-carboxylic acid-4'-benzene azo phenylamides are easily obtained in the same way with 2-hydroxy- or 2-acyloxy-naphthalene-3-carboxylic acid chloride.

Disazo dyestuffs according to the present invention which contain the sulphonyl group of the bridging member bound at the diazo component of the metallisable portion are obtained, for example, by condensation of benzoxazolone sulphonic acid chlorides with 4-aminoazobenzene or substitution products thereof, splitting of the oxazolone ring in an alkaline medium, diazotisation of the amino group and coupling of the diazomonoazo compound with a metallisable azo component. The 2-arylazo-1-hydroxybenzene-4- or -5-sulphonic acid-4'-benzene azophenylamides for examples are obtained in this way.

Disazo dyestuffs which contain the carbonyl or sulphonyl group of the bridging member X in the non-metallisable portion are obtained for example by condensation of azobenzene-4-carboxylic acid or sulphonic acid chloride with a hydroxybenzene or hydroxynaphthalene which contains a primary or secondary amino group and which couples in the o-position to the hydroxyl group, and coupling of the condensation product with an o-carboxy or o-hydroxy diazobenzene or diazonaphthalene compound.

The end products have advantageous properties if the disazo dyestuff containing sulphonic acid amide groups is further substituted at the amide nitrogen atom. For this purpose either amino-monoazo dyestuffs correspondingly substituted at the amino group are used as starting materials or the dyestuffs containing secondary amide groups are treated with alkylating agents, for example with dialkyl sulphates or alkyl halides.

The salts of trivalent chromium, for example chromic sulphate, chromic chloride, chromic fluoride, chromic acetate or chromic formiate are used as chroming agents. Also, with dyestuffs which are not sensitive to alkali, salts of hexavalent chromium can be used, for example, alkali bichromates. In this case, the presence of a reducing substance such as, e.g. glucose, is necessary. Finally, also complex chromium compounds such as chromo-salicylic acid ammonium or alkali salts can be used. To produce the 1:1 chromium complexes for the preferred addition process, the dyestuffs are treated advantageously with compounds of trivalent chromium in excess in an acid medium. Sulphonated dyestuffs are chromed advantageously in aqueous solution or suspension and unsulphonated dyestuffs in higher boiling alcohols or in the melts of amides of low fatty acids. The metallisation is performed at temperatures of 90–150° and, if necessary, under pressure. Particularly uniform 1:1 chromium complexes are obtained chiefly with sulphonated monoazo dyestuffs.

The metal-free azo dyestuffs are added to the 1:1 chromium complexes in a weakly acid, neutral or alkaline medium at a slightly raised temperature, for example 40–95°. The addition is performed advantageously in aqueous or aqueous/alcoholic medium and in the presence of agents which buffer the mineral acid or of alkaline agents such as, for example, sodium acetate, sodium carbonate, sodium hydroxide or the corresponding potassium or ammonium compounds. In most cases the addition is made quickly and completely. The new 2:1 chromium complex compounds are obtained from aqueous solutions by salting out and from alcoholic solution by precipitation with water or by distilling off the organic solvent.

The new chromium-containing azo dyestuffs according to the present invention are suitable for the dyeing of organic materials of the most various types in orange, brown, olive, blue, grey to violet shades. The dyestuffs which are insoluble in water are used principally for the dyeing of lacquers and varnishes, of paper, of viscose, nylon, cellulose ether and ester spinning masses and also of polyester condensates. Those which are water soluble are chiefly textile dyestuffs and are suitable in particular for the dyeing of wool, also of casein, superpolyamide and superpolyurethane fibres and also for the dyeing of leather and furs. The new dyestuffs can also be used for printing onto the materials mentioned. Of particular value in textile dyeing is that not only the 2:1 chromium complex dyestuffs according to the present invention containing the alkyl sulphonyl and sulphamide groups but also those containing one sulphonic acid group are distinguished by a good neutral drawing power onto wool. The wool dyeings are very level and are distinguished by remarkable fastness to light, very good wet fastness properties, for example, very good fastness to washing, milling and sea water, and, in many cases, also by the good fastness to alkali. In addition, the good to very good fastness to sulphur of the wood dyeings is remarkable.

Of the dyestuffs according to the present invention, principally those are valuable which correspond to the general formula

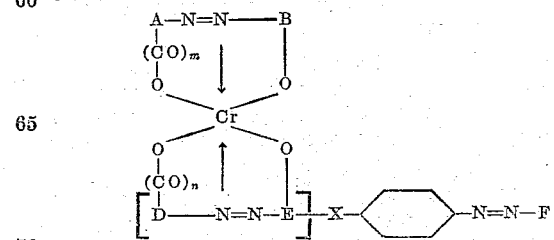

In this formula:

A represents a member selected from the group consisting of phenylene and naphthylene radicals containing the metallised group in o-position to the azo group, B and E each represent a member selected from the group consisting of phenylene, naphthylene and pyrazolene radicals containing the metallised group in o-position to the azo group, D represents a phenyl radical containing the metallised group in o-position to the azo group, F represents a member selected from the group consisting of phenylene and naphthylene radicals, X represents a member selected from the group consisting of —SO$_2$—O—,

and —CO—NH—, and $m$ and $n$ each represent one of the numerals 0 and 1.

A technically particularly valuable class corresponds to the general formula:

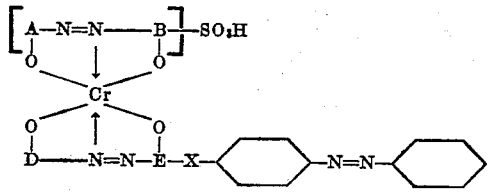

and those compounds are again preferred which correspond to the following formula

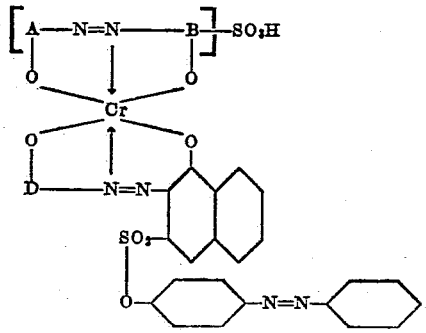

Further details can be seen from the following examples. The examples do not limit the invention in any way but only serve to illustrate the invention. Where not expressly stated, parts are given as parts by weight and their relationship to parts by volume is as that of grammes to cubic centimetres. The temperatures are in degrees centigrade.

EXAMPLE 1

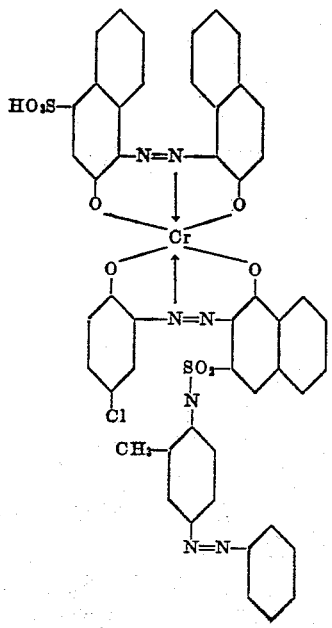

10 parts by volume of 2 N-caustic soda lye and 5.72 parts of the disazo dyestuff obtained by coupling diazotised 4-chloro-2-amino-1-hydroxybenzene with 1-hydroxynaphthalene-3-sulphonic acid-N-methyl-4'-benzene azo phenylamide, are added to 150 parts of water. The complex chromium compound of the type 1 atom chromium:1 dyestuff molecule, which corresponds to 0.52 part of chromium and 3.94 parts of the monoazo dyestuff from 1-diazo-2-hydroxynaphthalene-4-sulphonic acid and 2-hydroxynaphthalene, is added to this mixture. The mixture is heated at 90-95° until the starting substances have disappeared. The chromium-containing addition dyestuff is precipitated by the addition of sodium chloride. It is filtered off and dried. After drying, it is a dark powder which dyes wool from a neutral or weakly acid bath in wet fast, reddish navy blue shades.

A dyestuff having similar properties is obtained if instead of the disazo dyestuff from diazotised 4-chloro-2-amino-1-hydroxybenzene and 1-hydroxynaphthalene-3-sulphonic acid-N-methyl-4'-benzene azo phenylamide, 6.06 parts of the disazo dyestuff from 4-chloro-2-amino-1-hydroxybenzene and 1-hydroxynaphthalene-3-sulphonic acid-N-methyl-4'-(4"-chlorobenzene azo)-phenylamide is used.

EXAMPLE 2

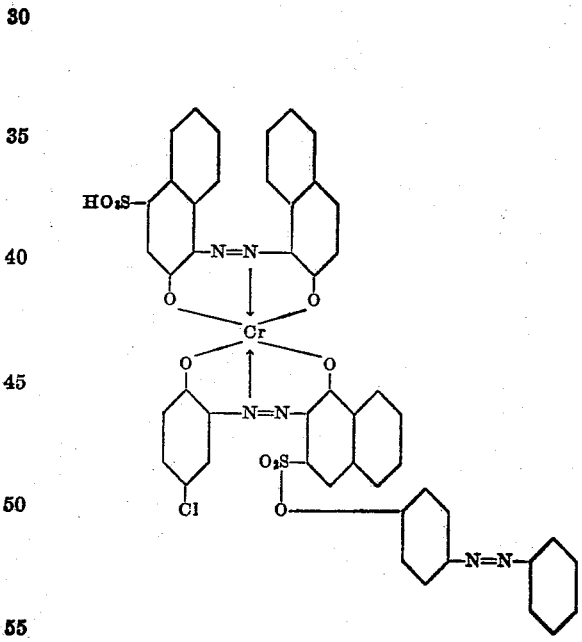

5.59 parts of the disazo dyestuff from diazotised 4-chloro-2-amino-1-hydroxybenzene and 1-hydroxynaphthalene-3-sulphonic acid-4'-benzene azo phenyl ester, also 4.44 parts of the complex chromium compound of the type 1 chromium atom:1 dyestuff molecule which corresponds to 0.52 part of chromium and 3.94 parts of the monoazo dyestuff from 1-diazo-2-hydroxynaphthalene-4-sulphonic acid and 2-hydroxynaphthalene, and 1.8 parts of sodium carbonate are added to 150 parts of water. The mixture is heated to 60-65° until the starting materials have disappeared. The chromium complex formed is precipitated by the addition of sodium chloride, filtered off and dried. After drying, it is a dark powder which dyes wool from a neutral or weakly acid bath in reddish navy blue shades. The wool dyeing is distinguished by good wet fastness properties.

EXAMPLE 3

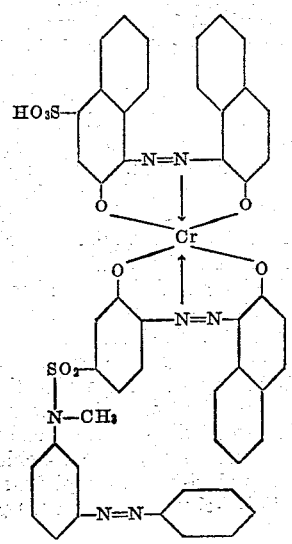

10 parts by volume of 2 N-caustic soda lye and 5.37 parts of the disazo dyestuff from diazotised 2-amino-1-hydroxybenzene-5-sulphonic acid-N-methyl-4'-benzene azo phenylamide and 2-hydroxynaphthalene are added to 150 parts of water. The complex chromium compound of the type 1 chromium atom:1 dyestuff molecule which corresponds to 0.52 part of chromium and 3.94 parts of the dyestuff from 1-diazo-2-hydroxynaphthalene-4-sulphonic acid and 2-hydroxynaphthalene is also added. The mixture is heated to 90–95° and kept at this temperature until the starting substances have disappeared. The new chromium-containing dyestuff is precipitated by the addition of sodium chloride, filtered off and dried. After drying, it is a dark powder which dyes wool from a neutral or weakly acid bath in fast grey-blue shades.

EXAMPLE 4

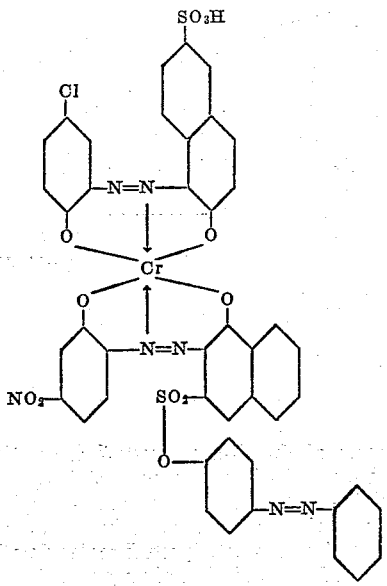

5.7 parts of the disazo dyestuff from diazotised 5-nitro-2-amino-1-hydroxybenzene and 1-hydroxynaphthalene-3-sulphonic acid-4'-benzene azo phenylester, also 4.28 parts of the complex chromium compound of the type 1 chromium atom:1 dyestuff molecule which corresponds to 0.52 part of chromium and 3.79 parts of the monoazo dyestuff from 4-chloro-2-amino-1-hydroxybenzene and 2-hydroxynaphthalene-6-sulphonic acid, and 1.8 parts of sodium carbonate are suspended in 150 parts of water. The mixture is heated to 60–65° and kept at this temperature until the starting substances have disappeared. The new chromium-containing dyestuff is precipitated by the addition of sodium chloride, filtered off and dried. After drying, it is a dark powder which dyes wool from a neutral or weakly acid bath in blue shades. The dyeings have good fastness properties.

EXAMPLE 5

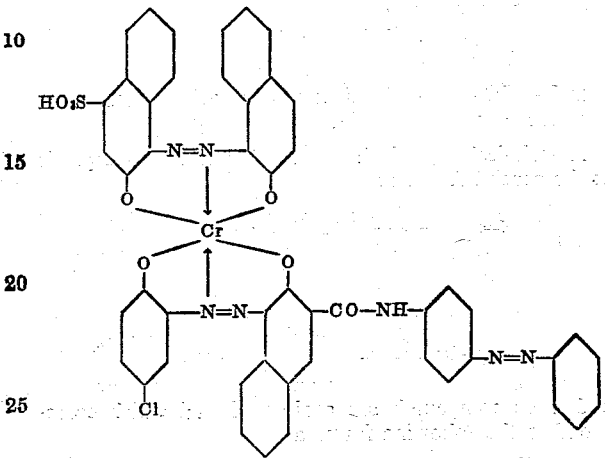

2 parts of crystallised sodium acetate and 5.22 parts of the disazo dyestuff from diazotised 4-chloro-2-amino-1-hydroxybenzene and 2-hydroxynaphthalene-3-carboxylic acid-4'-benzene azo phenylamide are added to 200 parts of aqueous 50% ethanol. Also the complex chromium compound the type 1 chromium atom:1 dyestuff molecule which corresponds to 0.52 part of chromium and 3.94 parts of the monoazo dyestuff from 1-diazo-2-hydroxynaphthalene-4-sulphonic acid and 2-hydroxynaphthalene is added. The mixture is warmed to 70–75° until the starting substances have disappeared. The alcohol is then distilled off and the reaction mixture is evaporated to dryness. The dyestuff is a dark powder. It dyes wool from a neutral or weakly acid bath in a fast grey shade.

EXAMPLE 6

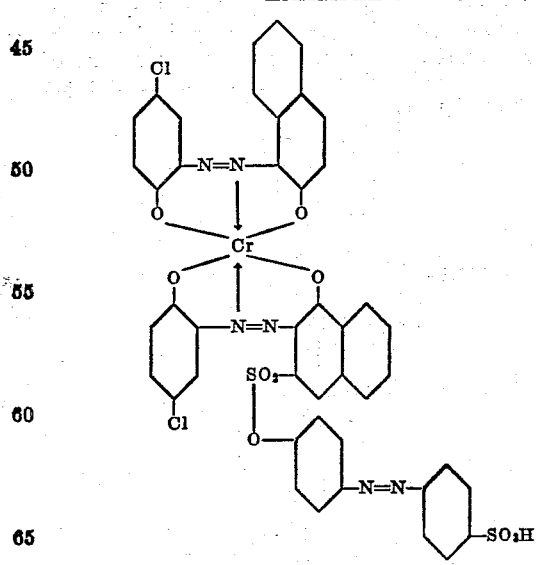

1.8 parts of sodium carbonate and 6.39 parts of the disazo dyestuff from diazotised 4-chloro-2-amino-1-hydroxybenzene and 1-hydroxynaphthalene-3-sulphonic acid-4'-(4"-sulphobenzene-azo)-phenylester are added to 150 parts of water. The complex chromium compound of the type 1 chromium atom:1 dyestuff molecule which corresponds to 0.52 part of chromium and 3.99 parts of the monoazo dyestuff from 4-chloro-2-amino-1-hydroxybenzene and 2-hydroxynaphthalene is then added. The mixture is heated to 60–65° and kept at this temperature until the starting substances have disappeared. The new chromium-containing dyestuff is precipitated by the addition of sodium chloride and isolated according to the usual methods. After drying, it is a dark powder which dyes wool in violet-blue shades. The dyeings have good fastness properties.

EXAMPLE 7

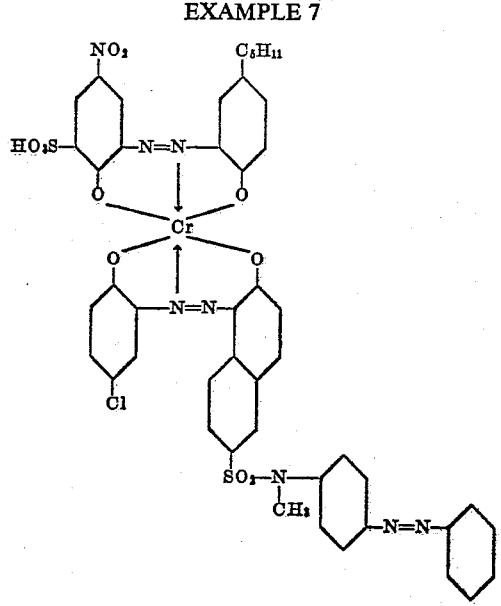

10 parts by volume of 2 N-caustic soda lye and 5.72 parts of the disazo dyestuff from diazotised 4-chloro-2-amino-1-hydroxybenzene and 2-hydroxynaphthalene-6-sulphonic acid-N-methyl-4'-benzene azo phenylamide are added to 150 parts of water. The complex chromium compound of the type 1 chromium atom:1 dyestuff molecule which corresponds to 0.52 part of chromium and 4.09 parts of the monoazo dyestuff from 4-nitro-2-amino-1-hydroxybenzene-6-sulphonic acid and 4-amyl-1-hydroxybenzene is then added. The mixture is heated at 90–95° and held at this temperature until the starting substances have disappeared. The new chromium-containing addition dyestuff is precipitated by the addition of sodium chloride and filtered off and dried. After drying it is a dark powder which dyes wool from a neutral or weakly acid bath in a fast brown shade.

EXAMPLE 8

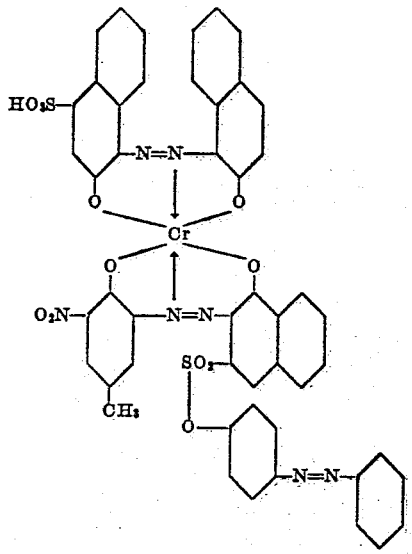

5.83 parts of the disazo dyestuff from diazotised 6-nitro-2-amino-4-methyl-1-hydroxybenzene and 1-hydroxynaphthalene-3-sulphonic acid-4'-benzene azo phenyl ester, also 4.44 parts of the complex chromium compound of the type 1 chromium atom:1 dyestuff molecule which corresponds to 0.52 part of chromium and 3.94 parts of the monoazo dyestuff from 1-diazo-2-hydroxynaphthalene-4-sulphonic acid and 2-hydroxynaphthalene, and 1.8 parts of sodium carbonate are added to 150 parts of water. The mixture is heated at 60–65° until the starting substances have disappeared. The chromium complex formed is precipitated by the addition of sodium chloride, filtered off and dried. After drying, it is a dark powder which dyes wool from a neutral to weakly acid bath in wet fast, blue shades which have good fastness to light.

EXAMPLE 9

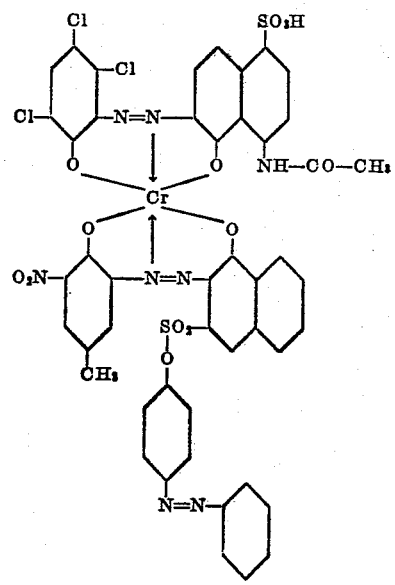

6.05 parts of the sodium salt of the disazo dyestuff from diazotised 6-nitro-4-methyl-2-amino-1-hydroxybenzene and 1-hydroxynaphthalene-3-sulphonic acid-4'-benzene azo phenyl ester, also 5.27 parts of the sodium salt of the monoazo dyestuff from diazotised 3.4.6-trichloro-2-amino-1-hydroxybenzene and 1-hydroxy-8-acetylaminonaphthalene-5-sulphonic acid are dissolved in 200 parts of ethylene glycol. After the addition of 40 parts of a solution of the sodium salt of disalicylate chromic acid (corresponding to 0.84 part of chromic oxide), the solution is kept at a temperature of 100–105° until the formation of the metal complex is complete. The chromium-containing dyestuff is precipitated by the addition of sodium chloride solution, filtered off and dried. It is a dark powder which dyes wool from a weakly acid bath in navy blue shades.

EXAMPLE 10

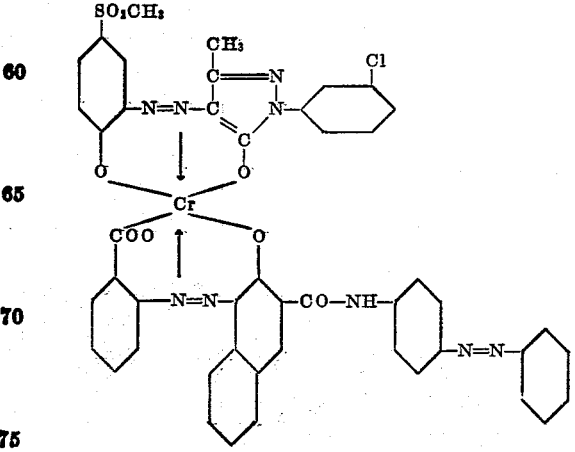

2 parts of crystallised sodium acetate and 5.15 parts of the disazo dyestuff from diazotised 2-aminobenzene-1-carboxylic acid and 2-hydroxynaphthalene-3-carboxylic acid-4'-benzene azo phenylamide are added to 150 parts of ethanol. Also the complex chromium compound of the type 1 chromium atom:1 dyestuff molecule which corresponds to 0.52 part of chromium and 4.07 parts of the monoazo dyestuff from 2-amino-1-hydroxybenzene-4-methyl sulphone and 1-(3'-chloro)-phenyl-3-methyl-5-pyrazolone is added. The mixture is heated at 70–75° until no more starting materials are present. The alcohol is then distilled off and the reaction mixture is evaporated to dryness. The dyestuff is a powder which dyes wool from a neutral or weakly acid bath in fast, brown-orange shades.

EXAMPLE 11

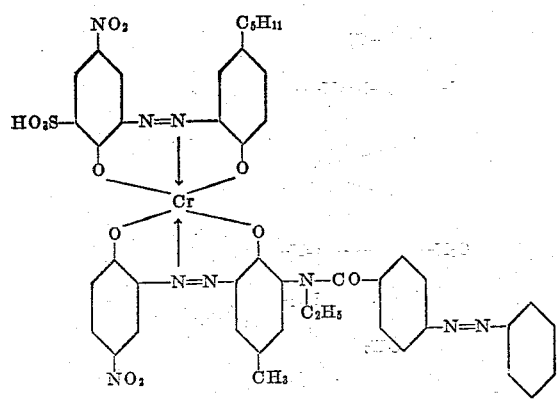

2 parts of crystallised sodium acetate and 5.24 parts of the disazo dyestuff from diazotised 4-nitro-2-amino-1-hydroxybenzene and 4-methyl-2-(4'-benzene azo benzoyl-N-ethylamino)-1-hydroxybenzene are added to 200 parts of aqueous 50% ethanol. Also the complex chromium compound of the type 1 chromium atom: 1 dyestuff molecule corresponding to 0.52 part of chromium and 4.09 parts of the monoazo dyestuff from 4-nitro-2-amino-1-hydroxybenzene-6-sulphonic acid and 4-amyl-1-hydroxybenzene is added. The mixture is warmed to 70–75° until the starting substances have disappeared. The alcohol is then distilled off and the reaction mixture is evaporated to dryness. The dyestuff is a dark powder. It dyes wool from a neutral or weakly acid bath a fast brown shade.

EXAMPLE 12

4 parts of the chromium-containing dyestuff according to Example 1 are dissolved in 4000 parts of water. 100 parts of previously wetted wool are entered at 40–50°. The bath is brought to the boil within half an hour, kept at the boil for 45 minutes and the wool is rinsed with cold water and dried. The navy blue dyeing obtained has good wet fastness properties.

EXAMPLE 13

4 parts of the chromium-containing dyestuff according to Example 8 are dissolved in 4000 parts of water. 100 parts of previously well wetted wool are entered at 40–50°. 2 parts of 40% acetic acid are added and the bath is brought to the boil within half an hour and kept for 45 minutes at boiling temperature. The wool is then rinsed with cold water and dried. The navy blue wool dyeing has good fastness properties.

A wool dyeing having similar properties is also obtained if dyeing is performed in a liquor containing Glauber's salt.

The following table contains other dyestuffs according to the present invention which are obtained by using the methods described in the above examples.

*Table*

| No. | Monoazo dyestuff | Disazo dyestuff | Shade of wool dyeing |
|---|---|---|---|
| 1 | 1-diazo-2-hydroxynaphthalene-4-sulphonic acid ⟶ 2-hydroxynaphthalene (3.94 parts). | 5-nitro-2-amino-1-hydroxybenezne ⟶ 1-hydroxynaphthalene-3-sulphonic acid-4'-benzene azo phenyl ester (5.7 parts). | grey blue. |
| 2 | do | 4-chloro-2-amino-1-hydroxybenzene ⟶ 1-hydroxynaphthalene-3-sulphonic acid-4'-naphthalene-(1")-azo phenyl ester (6.09 pts.). | navy blue. |
| 3 | do | 4-chloro-2-amino-1-hydroxybenzene ⟶ 1-hydroxynaphthalene-3-sulphonic acid-4'-naphthalene-(2")-azo phenyl ester (6.09 pts.). | Do. |
| 4 | do | 5-nitro-2-amino-1-hydroxybenzene ⟶ 1-hydroxynaphthalene-3-sulphonic acid-4'-naphthalene-(1")-azo phenyl ester (6.19 pts.). | grey blue. |
| 5 | do | 5-nitro-2-amino-1-hydroxybenzene ⟶ 1-hydroxynaphthalene-3-sulphonic acid-4'-naphthalene-(2")-azo phenyl ester (6.19 pts.). | Do. |
| 6 | do | 4-chloro-2-amino-1-hydroxybenzene ⟶ 1-hydroxynaphthalene-3-sulphonic acid-4'-(4"-chlorobenzene azo)-phenyl ester (5.93 pts.). | navy blue. |
| 7 | do | 4-chloro-2-amino-1-hydroxybenzene ⟶ 1-hydroxynaphthalene-3-sulphonic acid-4'-(4"-methoxybenzene azo)-phenyl ester (5.89 pts.). | Do. |
| 8 | do | 4-chloro-2-amino-1-hydroxybenzene ⟶ 1-hydroxynaphthalene-3-sulphonic acid-4'-(2"-methylbenzene azo)-phenyl ester (5.73 parts). | Do. |
| 9 | do | 4-chloro-2-amino-1-hydroxybenzene ⟶ 1-hydroxynaphthalene-3-sulphonic acid-4'-(2".6"-dimethyl benzene azo)-phenyl ester (5.87 pts.). | Do. |
| 10 | do | 5-nitro-2-amino-1-hydroxybenzene ⟶ 2-hydroxynaphthalene-3-carboxylic acid-4'-benzene azo phenyl amide (5.32 parts). | grey. |
| 11 | do | 6-nitro-4-methyl-2-amino-1-hydroxybenzene ⟶ 2-hydroxynaphthalene-3-carboxylic acid-4'-benzene azo phenylamide (5.46 pts.). | Do. |
| 12 | do | 4-chloro-2-amino-1-hydroxybenzene ⟶ 2-hydroxynaphthalene-3-carboxylic acid-N-methyl-4'-benzene azo phenylamide (5.36 pts.). | Do. |
| 13 | do | 4-chloro-2-amino-1-hydroxybenzene ⟶ 7-hydroxy-1-(4'-benzene-azo benzoylamino)-naphthalene (5.22 parts). | Do. |

Table—Continued

| No. | Monoazo dyestuff | Disazo dyestuff | Shade of wool dyeing |
|---|---|---|---|
| 14 | 4-chloro-2-amino-1-hydroxybenzene-6-sulphonic acid ⟶ 1-acetylamino-7-hydroxynaphthalene (4.36 pts.). | 4-chloro-2-amino-1-hydroxybenzine ⟶ 7-hydroxy-1-(4'-benzene azo benzoylamino)-napthalene (5.22 parts). | greenish grey. |
| 15 | 1-diazo-2-hydroxynaphthalene-4-sulphonic acid ⟶ 2-hydroxynaphthalene (3.94 pts.). | 5-nitro-2-amino-1-hydroxybenzene ⟶ 1-hydroxynaphthalene-3-sulphonic acid-N-methyl-4'-benzene azo phenyl amide (5.82 pts.). | grey-blue. |
| 16 | 6-nitro-1-diazo-2-hydroxynaphthalene-4-sulphonic acid ⟶ 2-hydroxynaphthalene (4.39 parts). | 4-chloro-2-amino-1-hydroxybenzene ⟶ 1-hydroxynaphthalene-3-sulphonic acid-4'-benzene azo-phenyl ester (5.59 parts). | violetty grey. |
| 17 | 4-nitro-2-amino-1-hydroxybenzene-6-sulphonic acid ⟶ 4-amul-1-hydroxybenzene (4.09 pts.). | 4-chloro-2-amino-1-hydroxybenzene ⟶ 2-hydroxynaphthalene-6-sulphonic acid-4'-benzene azo phenyl-ester (5.7 pts.). | brown. |
| 18 | ____do____ | 4-chloro-2-amino-1-hydroxybenzene ⟶ 2-hydroxynaphthalene-6-sulphonic acid-4'-benzene azo phenyl-ester (5.59 parts). | Do. |
| 19 | ____do____ | 4-chloro-2-amino-1-hydroxybenzene ⟶ 2-hydroxynaphthalene-6-sulphonic acid-N-ethyl-4'-benzene azo phenylamide (5.86 pts.). | Do. |
| 20 | 6-nitro-4-amyl-1-hydroxybenzene ⟶ 2-hydroxynaphthalene-4-sulphonic acid (4.59 pts.). | 4-chloro-2-amino-1-hydroxybenzene ⟶ 2-hydroxynaphthalene-3-carboxylic acid-4'-benzene azo phenylamide (5.22 parts). | blue-grey. |
| 21 | ____do____ | 4-chloro-2-amino-1-hydroxybenzene ⟶ 2-hydroxynaphthalene-3-carboxylic acid-4'-naphthalene-(1'')-azo phenylamide (5.72 pts.). | Do. |
| 22 | 1-diazo-2-hydroxynaphthalene-4-sulphonic acid ⟶ 2-hydroxynaphthalene (3.94 pts.). | 4-chloro-2-amino-1-hydroxybenzene ⟶ 2-hydroxynaphthalene-6-sulphonic acid-N-methyl-4'-benzene azo phenylamide (5.72 pts.). | reddish navy blue. |
| 23 | 4-chloro-2-amino-1-hydroxybenzene ⟶ 2-hydroxynaphthalene (3.99 parts). | 5-nitro-2-amino-1-hydroxybenzene ⟶ 1-hydroxynaphthalene-8-sulphonic acid-3-sulphonic acid-N-methyl-4'-benzene azo phenylamide (6.62 parts). | black. |
| 24 | 2-amino-1-hydroxybenzene-4-sulphonic acid ⟶ 5.8-dichloro-1-hydroxynaphthalene (4.13 pts.). | 4-chloro-2-amino-1-hydroxybenzene ⟶ 1-hydroxynaphthalene-3-sulphonic acid-4'-benzene azo phenyl ester (5.59 parts). | blue-violet. |
| 25 | ____do____ | 4-chloro-2-amino-1-hydroxybenzene ⟶ 1-hydroxynaphthalene-3-sulphonic acid-4'-(2''-ethoxybenzene azo)-phenyl ester (6.03 pts.). | Do. |
| 26 | 1-diazo-2-hydroxynaphthalene-4-sulphonic acid ⟶ 2-hydroxynaphthalene (3.94 parts). | 6-chloro-4-nitro-2-amino-1-hydroxybenzene ⟶ 1-hydroxynaphthalene-3-sulphonic acid-4'-benzene azo phenyl ester (6.04 pts.). | grey. |
| 27 | ____do____ | 4-chloro-2-amino-1-hydroxybenzene ⟶ 1-hydroxynaphthalene-3-sulphonic acid-N-ethyl-4'-benzene azo phenylamide (5.86 pts.). | navy blue. |
| 28 | ____do____ | 2-amino-1-hydroxybenzene-4-phenyl sulphone ⟶ 1-hydroxynaphthalene-3-sulphonic acid-4'-benzene azo phenyl ester (6.64 parts). | reddish grey. |
| 29 | 6-methyl-2-amino-1-hydroxybenzene-4-sulphonic acid ⟶ 2-hydroxynaphthalene (3.58 parts). | 4-chloro-2-amino-1-hydroxybenzene ⟶ 1-hydroxynaphthalene-3-sulphonic acid-4'-benzene azo phenyl ester (5.59 parts). | reddish navy blue. |
| 30 | 3.4.6-trichloro-2-amino-1-hydroxybenzene ⟶ 1-hydroxy-8-acetylaminonaphthalene-5-sulphonic acid (5.05 parts). | 2-amino-1hydroxybenzene-4-phenyl sulphone ⟶ 1-hydroxynaphthalene-3-sulphonic acid-4'-benzene azo phenyl ester (6.64 parts). | reddish violet. |
| 31 | 1-diazo-2-hydroxynaphthalene-4-sulphonic acid ⟶ 2-hydroxynaphthalene (3.94 parts). | 2-aminobenzene-1-carboxylic acid ⟶ 2-hydroxynaphthalene-3-carboxylic acid-4'-benzene azo phenylamide (5.15 parts). | reddish black. |
| 32 | 1-diazo-2-hydroxynaphthalene-4-sulphonic acid ⟶ 1-phenyl-3-methyl-5-pyrazolone (4.24 parts). | ____do____ | bordeaux red. |
| 33 | ____do____ | 4-chloro-2-amino-1-hydroxybenzene ⟶ 2-hydroxynaphthalene-3-carboxylic acid-4'-benzene azo phenylamide (5.22 parts). | dull violet. |
| 34 | ____do____ | 2-amino-1-hydroxybenzene-4-phenyl sulphone ⟶ 1-hydroxynaphthalene-3-sulphonic acid-4'-benzene azo phenyl ester (6.64 pts.). | bluish bordeaux. |
| 35 | 2-amino-1-hydroxybenzene-4-phenyl sulphone-3'-sulphonic acid ⟶ 1-(3'-chloro)-phenyl-3-methyl-5-pyrazolone (5.49 parts). | ____do____ | red brown. |
| 36 | 2-aminobenzene-1-carboxylic acid ⟶ 1-(4'-sulphonic acid)-phenyl-3-methyl-5-pyrazolone (4.02 parts). | 6-nitro-4-methyl-2-amino-1-hydroxybenzene ⟶ 1-hydroxynaphthalene-3-sulphonic acid-4'-benzene azo phenyl ester (5.83 parts). | yellowish olive. |
| 37 | 4-nitro-2-amino-1-hydroxybenzene-6-sulphonic acid ⟶ 4-amyl-1-hydroxybenzene (4.09 parts). | 4-nitro-2-amino-1-hydroxybenzene ⟶ 4-methyl-2-(4'-benzene azo benzoylamino)-1-hydroxybenzene (4.96 parts). | brown. |
| 38 | ____do____ | 4-nitro-6-chloro-2-amino-1-hydroxybenzene ⟶ 4-methyl-2-(4'-benzene azobenzoylamino)-1-hydroxybenzene (5.31 parts). | Do. |
| 39 | 1-diazo-2-hydroxynaphthalene-4-sulphonic acid ⟶ 2-hydroxynaphthalene (3.94 parts). | 2-amino-1-hydroxybenzene-5-sulphonic acid-N-ethyl-4'-benzene azo phenylamide ⟶ 2-hydroxynaphthalene (5.51 parts). | grey-blue. |
| 40 | 2-amino-1-hydroxybenzene-4-phenyl sulphone-3'-sulphonic acid ⟶ 1-(3'-chloro)-phenyl-3-methyl-5-pyrazolone (5.49 parts). | 6-nitro-4-methyl-2-amino-1-hydroxybenzene ⟶ 1-hydroxynaphthalene-3-sulphonic acid-4'-benzene azo phenyl ester (5.83 parts). | red brown. |

Table—Continued

| No. | Monoazo dyestuff | Disazo dyestuff | Shade of wool dyeing |
|---|---|---|---|
| 41 | 2-amino-1-hydroxybenzene-4-sulphonic acid ⟶ 1-(3'-chloro)-phenyl-3-methyl-5-pyrazolone (4.09 parts). | 2-amino-1-hydroxybenzene-5-sulphonic acid-N-methyl-4'-benzene azo phenylamide ⟶ 1-phenyl-3-methyl-5-pyrazolone (5.67 parts). | reddish orange. |
| 42 | 1-diazo-2-hydroxynaphthalene-4-sulphonic acid ⟶ 2-hydroxynaphthalene (3.94 parts). | 4-chloro-2-amino-1-hydroxybenzene ⟶ 2-hydroxynaphthalene-6-sulphonic acid-4'-benzene azo phenyl ester (5.59 pts.). | reddish blue. |
| 43 | ...do... | 4-chloro-2-amino-1-hydroxybenzene ⟶ 2-hydroxynaphthalene-6-sulphonic acid-N-methyl-4'-(2''-methoxy)-benzene azo phenylamide (6.02 parts). | Do. |
| 44 | ...do... | 4-chloro-2-amino-1-hydroxybenzene ⟶ 2-hydroxynaphthalene-6-sulphonic acid-N-ethyl-4'-benzene azo phenylamide (6.16 parts). | Do. |
| 45 | ...do... | 6-nitro-4-methyl-2-amino-1-hydroxybenzene ⟶ 2-hydroxynaphthalene-6-sulphonic acid-4'-benzene azo phenyl ester (6.05 parts). | blue. |
| 46 | 2-amino-1-hydroxybenzene-4-methylsulphone ⟶ 1-phenyl-3-methyl-5-pyrazolone (3.72 pts.). | 2-amino-1-hydroxybenzene-4-phenyl sulphone ⟶ 1-hydroxynaphthalene-3-sulphonic acid-4'-benzene azo phenyl ester (6.64 parts). | red brown. |
| 47 | 2-amino-1-hydroxybenzene-4-sulphonic acid amide ⟶ 1-phenyl-3-methyl-5-pyrazolone (3.73 parts). | ...do... | Do. |
| 48 | 2-amino-1-hydroxybenzene-4-methyl sulphone ⟶ 2-hydroxynaphthalene (3.42 parts). | 2-aminobenzene-1-carboxylic acid-5-sulphonic acid amide ⟶ 2-hydroxynaphthalene-3-carboxylic acid-4'-benzene azo phenylamide (5.94 parts). | brown violet. |
| 49 | 4-chloro-2-aminobenzene-1-carboxylic acid ⟶ 1-(4'sulphonic acid)-phenyl-3-methyl-5-pyrazolone (4.37 parts). | 6-nitro-4-methyl-2-amino-1-hydroxybenzene ⟶ 1-hydroxynaphthalene-3-sulphonic acid-4'-benzene azo phenyl ester (5.83 parts). | yellowish olive. |

What we claim is:

1. The complex chromium compound of the general formula

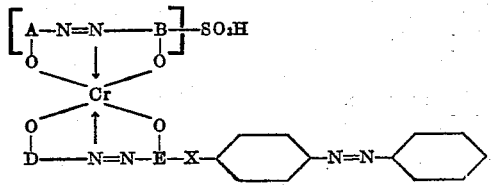

wherein:

A represents a member selected from the group consisting of phenylene and naphthylene radicals containing the metallised group in o-position to the azo group, B and E each represent a naphthylene radical containing the metallised group in o-position to the azo group, D represents a phenylene radical containing the metallised group in o-position to the azo group, X represents a member selected from the group consisting of —SO₂—O—,

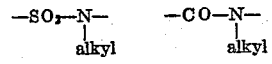

and —CO—NH—, each "alkyl" containing at most two carbon atoms.

2. The complex chromium compound of the general formula

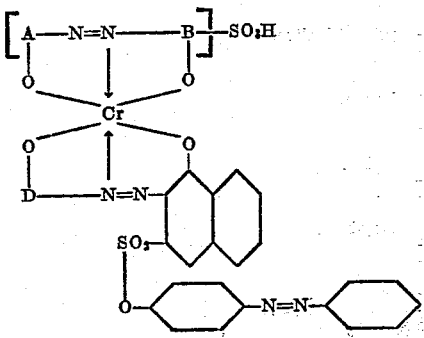

wherein:

A represents a member selected from the group consisting of phenylene and naphthylene radicals containing the metallised group in o-position to the azo group, B represents a naphthylene radical containing the metallised group in o-position to the azo group, and D represents a phenylene radical containing the metallised group in o-position to the azo group.

3. A complex chromium compound of the formula

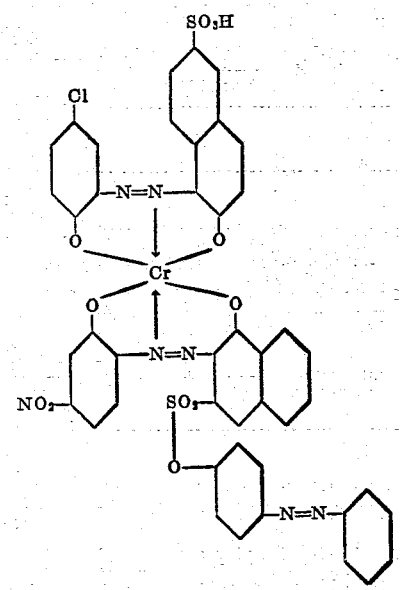

4. A complex chromium compound of the formula
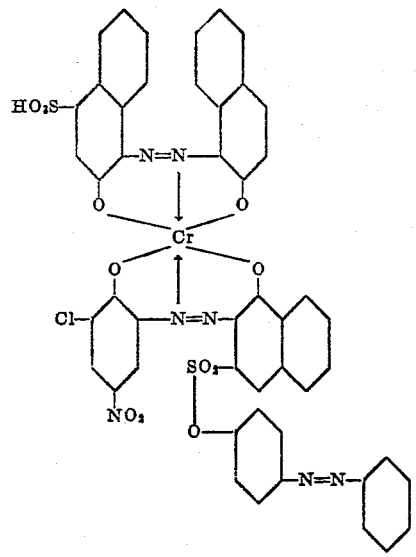
5. The complex chromium compound of the formula
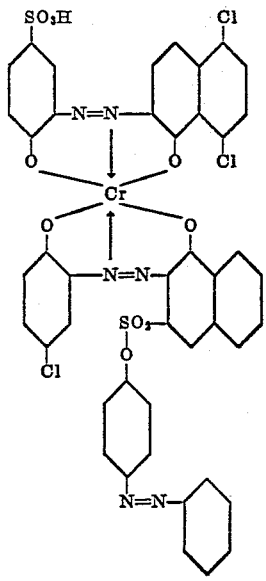
6. The complex chromium compound of the formula
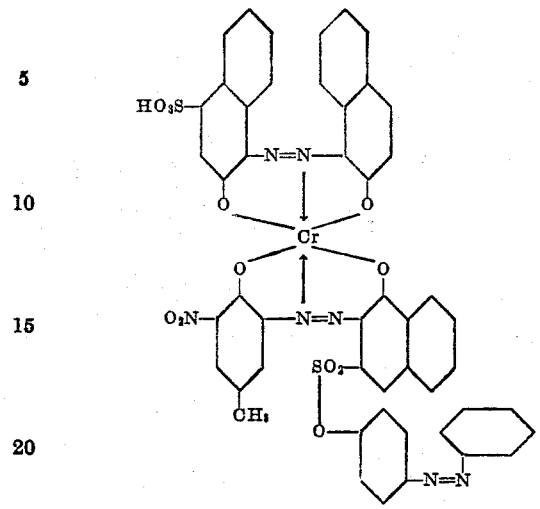
7. The complex chromium compound of the formula
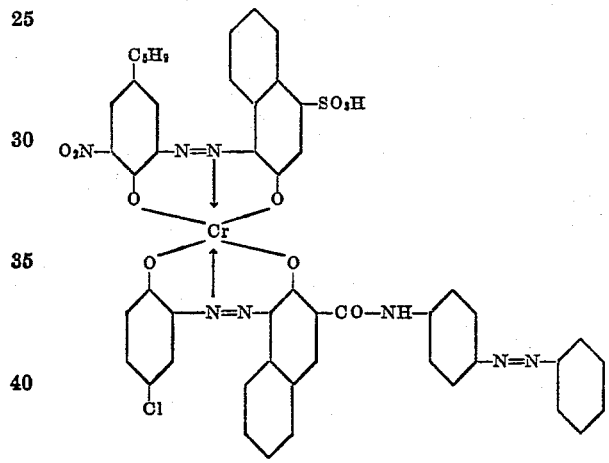
References Cited in the file of this patent
UNITED STATES PATENTS
2,559,331  Widmer et al. _____ July 3, 1951